Patented May 8, 1951

2,552,187

UNITED STATES PATENT OFFICE 2,552,187

EMULSION CONCENTRATE OF A BIOLOGICAL TOXICANT

Milton Kosmin, Dayton, Ohio, assignor to Monsanto Chemical Company, St. Louis, Mo., a corporation of Delaware No Drawing. Application December 28, 1946, Serial No. 719,109

7 Claims. (Cl. 167—43)

This invention relates to new and improved oil compositions which may be added to water to form permanent oil-in-water emulsions. These new oil compositions are further characterized by the fact that they will form oil-in-water emulsions without vigorous or prolonged agitation. The oils used in making these emulsions may contain various active ingredients dissolved therein, such as oil-soluble or dispersible insecticides, plant hormones, fungicides, herbicides and the like. As a group, these active ingredients may be referred to as biologically active materials.

More particularly, my invention pertains to a combination of two different types of surface-active agents which are dissolved in the oil for the purpose of making the oil easy to emulsify in water. In fact, these new compositions may be referred to as concentrates and, when insecticides, fungicides, herbicides, plant hormones and the like are dissolved in the oil concentrate, it serves as a useful means of preparing oil-in-water emulsions for spraying, painting, or otherwise applying.

When my invention is used to make oil-in-water emulsions adapted for use as agricultural sprays, the active ingredient possessing biological activity is dissolved in the oil along with the combination of surface-active agents. This mixture is then added to water and a permanent emulsion is obtained quickly and without agitation. Likewise, when oil-in-water emulsions are desired for use as cutting oils in the utilization of which it is necessary to reduce dermatitis, such as by the addition of antiseptics and biocides, generally, the agent which imparts improved cutting properties, such as sulfurized oils, is first dissolved in oil along with the mixture of surface-active agents and then the composition is added to water for the formation of oil-in-water emulsions.

Oil-in-water emulsions have been used before in many arts and various emulsifying agents have been used for the purpose of forming such emulsions. One feature of my invention resides in the discovery that a mixture of two types of surface-active agents gives a more stable oil-in-water emulsion than either of the surface-active agents when used alone, and in addition, these oil-in-water emulsions form quickly and substantially without the aid of agitation. In fact, the oil-in-water emulsions are formed from the concentrate by a process of self-dispersion.

My emulsifiable concentrate or improved oil composition may, in its broad aspects, consist of the following ingredients by weight: oil 20% to 90%; auxiliary solvents such as pine oil, water, methylene chloride or mixtures thereof 0% to 25%, but when water is used, amounts up to only 10% are preferred; sulfonated or sulfated surface-active agent 3% to 10%; polyglycol thioethers 3% to 10%; and addition agents, such as insecticides, fungicides, herbicides, addition agents for lubricants and the like, 4% to 60%. The particular use to be made of the oil concentrate will determine the range of ingredients to use and the examples set forth hereinafter will illustrate several modifications of my invention.

The term "oil" or "aromatic oil," as used in my invention, is limited to hydrocarbon liquids which boil within the ranges of 176° F. and 760° F. at atmospheric pressure, and are aromatic in nature or contain at least 15% of aromatic hydrocarbons boiling within the range of 176° F. and 760° F. One of the essential features of my invention resides in the use of oils or aromatic oils, as described above, in connection with two different types of surface-active agents, as hereinafter described. Typical examples of these hydrocarbon oils are benzene, toluene, xylene, monomethyl naphthalenes, dimethyl naphthalenes, trimethyl naphthalenes, tetramethyl naphthalenes, ethyl naphthalenes, pine oil and mixtures of oils containing aromatic hydrocarbons. Likewise, petroleum fractions boiling within the above range which are aromatic in nature, containing at least 15% (and preferably 20%) aromatic hydrocarbons, may also be used, and the preferred source of these oils is from recycle stocks which have been cracked with the aid of catalysts, such as those containing silica and alumina. The preferred boiling range of the oils used in my invention is between 176° F. and 570° F. Illustrative examples of petroleum hydrocarbon fractions which may be used are as follows:

| | Oil A | Oil B | Oil C | Oil D |
|---|---|---|---|---|
| (1) API Gravity @ 60° F. | 22.5 | 13.9 | 12.3 | 24.3 |
| (2) Initial Boiling Point °F. | 360 | 455 | 500 | 385 |
| (3) 50% Boiling Point °F. | 418 | 487 | 528 | 428 |
| (4) 90% Boiling Point °F. | 450 | 505 | 550 | 475 |
| (5) End Boiling Point °F. | 465 | 520 | 565 | 505 |

Another group of aromatic oils which have proven very effective in the making of our concentrates is as follows:

| | Oil E | Oil F | Oil G |
|---|---|---|---|
| (1) API Gravity @ 60° F. | 11.5–13.5 | 10.5–12.5 | 3.5–8.5 |
| (2) Initial Boiling Point °F. | 440–450 | 480–495 | 520–540 |
| (3) 50% Boiling Point °F. | 480–490 | 520–535 | 610–630 |
| (4) 90% Boiling Point °F. | 500–510 | 540–555 | 690–710 |
| (5) End Boiling Point °F. | 515–520 | 555–565 | 700–725 |

Oil E is composed of at least 75% to 80% dimethyl naphthalenes, oil F contains at least 75% to 80% trimethyl naphthalenes and oil G contains at least 75% to 80% tetramethyl naphthalenes. These oils may be prepared by mixing the corresponding alkyl-substituted naphthalenes with other petroleum hydrocarbons, or they may be separated as cuts from hydrocarbon oil fractions high in alkyl-substituted naphthalenes.

Naphthenic constituents are also valuable as adjuncts in the present relationship. Such components may also be realized from cracking operations from certain feedstocks which contain appreciable quantities of such materials. The proportions of both naphthenic and aromatic constituents in the oil may also be augmented by treatments such as hydroforming carried out in the presence of catalysts of the polybdenum group.

The two surface-active agents used in my invention are selected from two different classes of organic compounds. One class of surface-active agents, for convenience referred to as class A, comprises the oil soluble organic sulfates or sulfonates having a Draves wetting time of 10.5 seconds or less in 0.5% aqueous solution. This class of surface-active agents is usually called wetting agents. The method of determining this Draves wetting time or sinking time is described in the 1944 Yearbook of the American Association of Textile Chemists and Colorists, volume XXI, page 199. Examples within this class of surface-active agents are the alkali metal and amine salts of a mono-, di- or trisulfonated aromatic hydrocarbon of the benzene series, such as benzene, toluene and xylene, wherein the aromatic nucleus also contains an aliphatic side chain containing from 10 to 18 (and preferably 10 to 14) carbon atoms. These agents may be represented by the general formula:

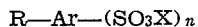

$$R\text{—}Ar\text{—}(SO_3X)_n$$

wherein Ar stands for an aromatic hydrocarbon radical of the benzene series, $n$ stands for a whole number such as 1, 2 or 3, X stands for an alkali-metal such as sodium or potassium, and R stands for an aliphatic hydrocarbon chain containing from 10 to 18 carbon atoms. Typical examples of these emulsifying agents are the alkali-metal salts of decyl-, dodecyl-, tetradecyl- or ocetadecyl-benzene sulfonic acid, as well as the corresponding di- or trisulfonated product. Also mixtures of these wetting agents may be used.

Additional examples of various types of sulfonated and sulfated wetting agents of class A are sulfo-succinic acid dialkyl esters, such as sodium dihexyl sulfo-succinate, sodium dioctyl sulfo-succinate, sodium didecyl sulfo-succinate, sodium didodecyl sulfo-succinate and the like; dialkyl-cyclohexylamine-dodecyl sulfate and similar products wherein the alkyl groups contain from 1 to 4 carbon atoms and the dodecyl group is replaced by alkyl groups containing from 10 to 18 carbon atoms such as dimethyl-cyclohexylamine - octadecyl sulfate, dibutyl-cyclohexylamine decyl sulfate and the like; alkylated biphenyl sodium mono-sulfonates such as monobutyl-, monoamyl- or mono-octylbiphenyl sodium mono-sulfonate; dialkylated phenyl phenol sodium disulfonates such as dibutyl phenyl phenol sodium disulfonate, diamyl phenyl phenol sodium disulfonate, dihexyl phenyl phenol sodium disulfonate, butyl naphthalene sodium monosulonate, isopropyl naphthalene sodium monosulfonate, decyl or dodecyl sodium sulfate and the like. All of the foregoing products are sulfonates or sulfates, soluble in the oil used in making my herein-described concentrate and are effective wetting agents as demonstrated by their ability to give a Draves wetting time of 10.5 seconds or less in an aqueous solution containing 0.5% by weight of the wetting agent.

The second class of surface-active agents, for convenience referred to as class B, consists of the condensation products of an alkylene oxide, such as ethylene or propylene oxide, and a branched chain mercaptan. By a branched chain mercaptan I mean a chemical compound having an —SH group linked to a carbon atom of a hydrocarbon molecular structure which exhibits a plurality of terminal groups. Thus, secondary and tertiary types may be utilized in the invention, although I prefer that the ramifications be as extensive as possible, generally characterized by the term ramulose. However, the individual branched-chains should consist principally of aliphatic or open chains in contrast to aromatic or other cyclic types.

The preferred branched chain mercaptans which are used may be derived from petroleum aliphatic sources. Thus it is known in the art of ofieln polymerization to make liquid polymers of the isooctene type having from 6 to 20 or more carbon atoms, although the preferred range in the present relationship is 6 to 18 carbon atoms. Such polymers are characterized by pronounced branching, of the carbon skeletons of the molecule, and when reacted with hydrogen sulfide to form mercaptans are predominantly of the tertiary type. Furthermore, it is possible to effectuate even greater branching of the polymer feed stock, together with a net shift of the reactive point to a central location of the molecules before mercaptan formation by utilizing a reforming or isomerizing reaction to obtain substantially complete consolidation in type to tertiary structures of the reacting molecules.

The branched chain mercaptans used in the instant condensation products are thus distinguished as to type from the straight-chain aliphatic and cycloaliphatic mercaptans, since such aliphatic compounds have chains free from alkyl substituents.

A sample of the tertiary dodecyl mercaptan feed stock useful in carrying out the invention, when subjected to distillation by the ASTM method carried out at 5 mm. absolute pressure, showed an initial boiling point of 172° F. and 95% overhead at 207° F. The mercaptan content was found to be 96.8%; the average molecular weight was 193.3; the specific gravity (60/60° F.) was 0.8713 and a sample was found to analyze 15.9% sulfur, indicating a mono-mercaptan. Because the chemical bounding required to achieve the present branched - chain mercaptan-alkylene oxide compositions, mono-mercaptans are the preferred embodiment.

When the condensation to obtain the said second class of surface-active agents is carried out, as described, it is desirable to have present a catalyst such as sodium or potassium hydroxide. The carbonates may also be used, but I prefer the use of the hydroxide. Apparently a basic catalyst forms an intermediate compound with the mercaptan and may then enter into chain formation, but it has been observed that the reaction product gives a neutral reaction in aqueous solution, so that any basicity is apparently lost in the final condensation product. Hence, the invention is not to be limited as to any theory, since the above is offered only by way of explanation, regardless of its seeming validity.

The alkylene oxide ratio may be varied from equivalent proportions with the mercaptan to as high as a 40 molar ratio. However, the preferred range is from 5 to 25 moles of ethylene oxide per mole of the branched-chain mercaptan.

As descriptive of the second surface-active agent, namely, the branched-chain mercaptan-ethylene oxide condensation product, reference is made to my copending application, Serial Number 718,133, filed December 23, 1946.

As pointed out hereinbefore, these emulsifiable oil concentrates may also carry various addition agents; for example, insecticides such as amyl benzyl cyclohexylamine; monochloro-orthonitrodiphenyl; ethylbenzoyl-cyclohexylamine; organic thiocyanates, such as β-butoxy, β'-thiocyanodiethyl ether, phenyl benzyl ether having a phenyl substituent containing a thiocyano group, bornyl and fenchyl thiocyanoacetate; alkyl ethers of pentachlorophenol, such as the propyl, butyl and amyl ethers of pentachlorophenol; 2,2-bis-(parachlorophenyl) - 1,1,1 - trichloroethane, 2,2 - bis-(parafluorophenyl) -1,1,1-trichloroethane; nicotine; pyrethrum and the like. The foregoing cyclohexylamine derivatives may be referred to generally by the following formula:

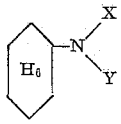

wherein X represents an alkyl group containing from 2 to 8 carbon atoms, such as the ethyl, butyl, amyl, hexyl and octyl radicals, and Y is a benzyl or benzoyl group.

The class of insecticides illustrated by the above-mentioned trichloroethane compound may be illustrated by the following formula:

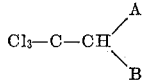

wherein A and B represent monovalent radicals selected from the group consisting of aliphatic, araliphatic and aromatic radicals of the benzene series. Examples of such radicals are ethyl, propyl, butyl, amyl, phenyl, fluorophenyl, chlorophenyl, methoxyphenyl, ethoxyphenyl, benzyl and the like. The radicals A and B may be the same or different radicals, for example, A may be a phenyl radical and B a chloro- or fluoro-phenyl radical. Mixtures of the foregoing insecticides may also be used, for example, a mixture of monochlor - orthonitrobiphenyl and 2,2 - bis-(parachloro-phenyl) - 1,1,1 - trichloroethane, in which the biphenyl derivative is used in the ratio of 2 or 3 parts to 1 part by weight of the trichloroethane derivative.

Examples of herbicides that may be added to the oil concentrates are pentachlorophenol, orthodichlorobenzene, phenoxy acetic acid, halogenated phenoxy acetic acid, such as 2,4-dichlorophenoxy acetic acid.

When the above insecticides, fungicides, herbicides and the like are added to the oil concentrate, it is sometimes desirable to add an auxiliary solvent which increases their solubility in the oil. Small amounts of water, pine oil, brown camphor oil, methylene chloride and the like are suitable for this purpose. The amount of water used should not exceed 10%, but the other auxiliary solvents may be used in amounts up to 25% by weight.

The examples below illustrate some of the specific embodiments of my invention.

Example I

An emulsifiable concentrate was prepared by mixing the following:

| | Per cent |
|---|---|
| (1) Hydrocarbon oil — boiling substantially between 450 and 520° F. and composed primarily of aromatic hydrocarbons | 90 |
| (2) Dodecyl benzene sodium monosulfonate | 5 |
| (3) Condensation product of 1 mole of tert.-tetradecyl mercaptan and between 10 and 15 moles of ethylene oxide | 5 |

This concentrate may be added to water in almost any proportion desired for the formation of a permanent oil-in-water emulsion. Likewise, various oil-soluble materials, such as insecticides, fungicides, herabicides and the like may be added to the oil, in the above concentrate, and then when such concentrates are added to water, the permanent oil-in-water emulsion may be used as an insecticide, fungicide and the like.

Example II

An emulsifiable concentrate was prepared by mixing the following:

| | Per cent |
|---|---|
| (1) Oil—boiling substantially between 440 and 520° F. and composed primarily of dimethyl naphthalenes and a small amount of naphthalene hydrocarbons | 60 |
| (2) Auxiliary—water | 5 |
| (3) Insecticide, such as amyl benzyl cyclohexylamine or 2,2-bis-(parachlorophenyl)-1,1,1-trichlorethane or mixtures of these two materials | 25 |
| (4) Alkyl-substituted benzene sodium monosulfonate wherein the alkyl chain contains from 10 to 14 carbon atoms | 5 |
| (5) Condensation product of 1 mole of tert.-dodecyl mercaptan and 10 moles of ethylene oxide | 5 |

This concentrate may be mixed with water in a great variety of proportions for the formation of an oil-in-water emulsion containing from 1 to 10% of the insecticide material. One part of the above concentrate in 4 parts of water will give a permanent oil-in-water emulsion containing 5% of the insecticide. Likewise, when 1 part of the concentrate is mixed with 24 parts of water, the resulting oil-in-water emulsion will contain 1% of the insecticide. Concentrates, as described above, may be added to water to form oil-in-water emulsions containing in combination as little as 0.1% to 0.5% amyl benzyl cyclohexylamine and 0.04% to 0.1% of 2,2-bis-(parachlorophenyl)-1,1,1-trichloroethane and used in green-houses to combat mites and other plant pests.

In the above formulation of the concentrate, the alkyl-substituted benzene sodium monosulfonate and the condensation product containing ethylene oxide with a branched-chain mercaptan may vary from 3% to 10% by weight, but as a rule, 5% of each is sufficient. The small amount of water in the concentrate serves as an auxiliary solvent to give a quick break and assists with the formation of a clear solution and this may vary from 0% to about 10%. Other auxiliary solvents, such as pine oil, methylene chloride and the like, may be added to the concentrate to assist with the formation of clear solutions.

*Example III*

An emulsifiable concentrate was prepared by mixing the following:

|  | Per cent |
|---|---|
| (1) Oil—boiling between 450 and 530° F. and comprising essentially polyalkyl naphthalenes and naphthene hydrocarbons | 25 |
| (2) Amyl benzyl cyclohexylamine (insecticide) | 50 |
| (3) Pine oil | 15 |
| (4) Alkyl-substituted benzene sodium monosulfonate wherein the alkyl group contains from 10 to 12 carbon atoms | 5 |
| (5) Condensation product of 1 mole of tert.-tetradecyl mercaptan and 20 to 25 moles of ethylene oxide | 5 |

This concentrate was then diluted with water to form an oil-in-water emulsion containing about 0.3% by weight of the amyl benzyl cyclohexylamine. This oil-in-water emulsion is stable and formed without agitation. This emulsion has proven to be very effective against the control of red spiders on vegetation.

In the foregoing concentrate, I have found it convenient to prepare variations wherein the oil content ranges from 20% to 70%, the pine oil or other auxiliary solvent may vary from 0% to 20%, the amyl benzyl cyclohexylamine, an oily liquid product, may vary from 10% to 60% and each of the surface-active agents may vary from 3% to 10%. In formulations of this type I am able to use small amounts of oil because the amyl benzene cyclohexylamine is liquid. As indicated hereinbefore, these concentrates may be added to water to form oil-in-water emulsions containing varying amounts of the insecticide, for example, from 0.05% to 1%.

*Example IV*

An emulsifiable concentrate was prepared by mixing the following:

|  | Per cent |
|---|---|
| (1) Oil—xylene or a mixture of xylene and 20% pine oil | 87.5 |
| (2) Herbicide or plant hormone (2,4-dichlorphenoxy) acetic acid | 5.0 |
| (3) Alkyl benzene sodium mono-sulfonate wherein the alkyl group contains from 10 to 14 carbon atoms | 5.0 |
| (4) Condensation product of 1 mole of tert.-dodecyl mercaptan and 25 moles of ethylene oxide | 2.5 |

When the above concentrate is added to 50 parts of water a permanent oil-in-water emulsion is formed without agitation and this has proved very effective as a herbicide against broad leaf weeds. When the above concentrate is diluted with 5000 parts of water to form an oil-in-water emulsion, it has proven effective as a plant stimulant or hormone.

*Example V*

An emulsifiable concentrate was prepared by mixing the following:

|  | Per cent |
|---|---|
| (1) Oil—distilling between 450 and 520° F. and comprising at least 60% dimethyl naphthalenes and the remainder essentially naphthene hydrocarbons | 40 |
| (2) Pine oil | 20 |
| (3) Insecticide—2,2 - bis - (parachlorophenyl)-1,1,1-trichlorethane | 25 |
| (4) Dodecyl benzene sodium monosulfonate | 5 |
| (5) Condensation product of 1 mole of tert.-tetradecyl mercaptan and 5 moles of ethylene oxide | 5 |

This concentrate was then added to water to form an oil-in-water emulsion containing any desired amount of the insecticide, for example, from 0.5% to 5% of the insecticide. In making the foregoing concentration, the amount of oil used may vary conveniently from 30% to 60%, the pine oil may vary from 5% to 30%, the insecticide may vary from 20% to 50% and each of the surface-active agents may vary from 3% to 10%. When these formulations are added to water to make an oil-in-water emulsion containing the insecticide in amounts ranging from 0.5% to 5%, the oil-in-water emulsion or spray may be used very effectively to combat flies, mosquitoes, Colorado potato beetles and the various insects that attack agricultural crops. Concentrates for making oil-in-water emulsions for use as a spray against mites can be prepared according to Example V or according to the modifications set forth above by substituting the trichloroethane derivative with amyl benzyl cyclohexylamine or a 3 to 1 mixture of monochlororthonitrobiphenyl and 2,2-bis-(parachlorophenyl)-1,1,1-trichlorethane. Furthermore, the oil-in-water emulsion may be prepared by pouring the concentrate into the desired amount of water and the emulsion will form without any agitation and will remain stable for long periods of time without showing any tendency to separate.

As indicated hereinbefore, instead of using one biocide in my emulsifiable oils, I may add two or more materials and the amounts used may be chosen so that when the concentrates are added to water the resulting oil-in-water emulsion will contain the desired concentrate of active substitutents.

When attempts were made to prepare dispersible oil concentrates by using only one of the herein described surface-active agents, the results were highly unsatisfactory or complete failures. For example, when 90 parts by weight of xylene was mixed with 10 parts by weight of the condensation product of 1 mole of tert.-dodecyl mercaptan and 10 to 40 moles of ethylene oxide, and then added to water, practically no dispersion or oil-in-water emulsion was formed. However, when 90 parts by weight of xylene were mixed with 5 parts by weight of the above condensation product and 5 parts by weight of dodecyl benzene sodium monosulfonate and then the solution added to water, an excellent oil-in-water emulsion was formed without agitation and the oil remained dispersed for several weeks without showing any tendency to separate. Likewise when 90 parts by weight of an oil boiling within the range of 450° F. to 530° F. and comprising at least 75% dimethyl naphthalenes was mixed with 10 parts by weight of the condensation product of 1 mole of tert.-tetradecyl mercaptan and 10 moles of ethylene oxide, the resulting solution was then added to water. Instead of forming a milky oil-in-water emulsion, most of the oil was dispersed in large particles which soon collected on top of the water. However, when 90 parts of this oil was mixed with 5 parts of the same ethylene oxide condensation product and 5 parts by weight of sodium dioctyl sulfo-succinate, and then the oil concentrate added to water, an excellent oil-in-water emulsion formed without agitation and which was permanent. When the foregoing pair of comparative tests were repeated with mixtures of the oil and various insecticides, herbicides and the like—oil contents ranging from 20% to 80%—the same results were obtained. In each case the two surface-active agents were greatly superior to either of them alone.

I claim:

1. A water-dispersible concentrate for forming oil-in-water emulsions comprising an aromatic oil; a biological toxicant; from 3% to 10% by weight of an oil-soluble organic surface-active agent selected from the group consisting of sulfonates and sulfates and having a Draves wetting time of less than 10.5 seconds in an aqueous solution consisting of 0.5% by weight of said surface-active agent; and from 3% to 10% by weight of the condensation product of 1 mole of a $C_6$–$C_{18}$ branched-chain aliphatic mercaptan with from 1 to 40 moles of ethylene oxide.

2. A water-dispersible concentrate for forming oil-in-water emulsions comprising from 20% to 90% by weight of an aromatic oil; from 4% to 60% by weight of a biological toxicant; from 3% to 10% by weight of an oil-soluble organic surface-active agent selected from the group consisting of sulfonates and sulfates and having a Draves wetting time of less than 10.5 seconds in an aqueous solution consisting of 0.5% by weight of said surface-active agent; and from 3% to 10% by weight of the condensation product of 1 mole of a $C_6$–$C_{18}$ branched-chain aliphatic mercaptan with from 1 to 40 moles of ethylene oxide.

3. A water-dispersible concentrate for forming oil-in-water emulsions comprising an aromatic oil; an insecticide; from 3% to 10% by weight of an oil-soluble organic surface-active agent selected from the group consisting of sulfonates and sulfates and having a Draves wetting time of less than 10.5 seconds in an aqueous solution consisting of 0.5% by weight of said surface-active agent; and from 3% to 10% by weight of the condensation product of 1 mole of a $C_6$–$C_{18}$ branched-chain aliphatic mercaptan with from 1 to 40 moles of ethylene oxide.

4. A water-dispersible concentrate for forming oil-in-water emulsions comprising an aromatic oil; a herbicide; from 3% to 10% by weight of an oil-soluble organic surface-active agent selected from the group consisting of sulfonates and sulfates and having a Draves wetting time of less than 10.5 seconds in an aqueous solution consisting of 0.5% by weight of said surface-active agent; and from 3% to 10% by weight of the condensation product of 1 mole of a $C_6$–$C_{18}$ branched-chain aliphatic mercaptan with from 1 to 40 moles of ethylene oxide.

5. A water-dispersible concentrate for forming oil-in-water emulsions comprising an aromatic oil distilling within the range of 176° F. and 570° F; from 20% to 30% by weight of an oil-soluble insecticide; a small amount of water not exceeding 10% by weight; from 3% to 10% by weight of an oil-soluble organic surface-active agent selected from the group consisting of sulfonates and sulfates and having a Draves wetting time of less than 10.5 seconds in an aqueous solution consisting of 0.5% by weight of said surface-active agent; and from 3% to 10% by weight of the condensation product of 1 mole of a $C_6$–$C_{18}$ branched-chain aliphatic mercaptan with from 1 to 40 moles of ethylene oxide.

6. A water-dispersible concentrate for forming oil-in-water emulsions comprising an aromatic oil; 2,2-bis-(para-chlorophenyl)-1,1,1-trichloroethane; from 3% to 10% by weight of an oil-soluble organic surface-active agent selected from the group consisting of sulfonates and sulfates and having a Draves wetting times of less than 10.5 seconds in an aqueous solution consisting of 0.5% by weight of said surface-active agent; and from 3% to 10% by weight of the condensation product of one mole of a $C_6$–$C_{18}$ branched-chain aliphatic mercaptan with from 1 to 40 moles of ethylene oxide.

7. A water-dispersible concentrate for forming oil-in-water emulsions comprising from 20% to 90% by weight of an aromatic oil; from 4% to 60% by weight of 2,2-bis-(para-chlorophenyl)-1,1,1-trichloroethane; from 3% to 10% by weight of an oil-soluble organic surface-active agent selected from the group consisting of sulfonates and sulfates and having a Draves wetting time of less than 10.5 seconds in an aqueous solution consisting of 0.5% by weight of said surface-active agent, and from 3% to 10% by weight of the condensation product of one mole of a $C_6$–$C_{18}$ branched-chain aliphatic mercaptan with from 1 to 40 moles of ethylene oxide.

MILTON KOSMIN.

REFERENCES CITED

The following references are of record in the file of this patent:

UNITED STATES PATENTS

| Number | Name | Date |
|---|---|---|
| 1,970,578 | Schoeller et al. | Aug. 21, 1924 |
| 2,129,709 | Schuette | Sept. 13, 1938 |
| 2,172,690 | O'Kane | Sept. 2, 1939 |
| 2,377,466 | Herbert | Dec. 21, 1943 |
| 2,412,720 | Dolman | Dec. 17, 1946 |
| 2,447,475 | Kaberg et al. | Aug. 17 1948 |

OTHER REFERENCES

King: Manufacturing Chemist, Sept. 1941, pages 211–213, 217 (see page 213).